Patented June 1, 1943

2,320,954

UNITED STATES PATENT OFFICE 2,320,954

GROUTING MEANS AND PROCESS

Francis Daly Sullivan, Memphis, Tenn.

No Drawing. Application February 9, 1940,
Serial No. 318,177

2 Claims. (Cl. 61—36)

This invention relates to the treatment of clays and more particularly to clays of the bentonite type.

An object of this invention is to provide an improved method and means whereby the colloidal properties present in bentonite may be reproduced in similar clays.

Another object of this invention is to provide an improved method and means by which clay known as non-swelling montmorillonite may be transformed into a swelling montmorillonite.

A further object of this invention is to provide an improved method and means for grouting in the drilling of oil wells, building of dikes, tunnels, levees, or dams and the like whereby the soil or subsoil to be grouted may be initially treated to effect a greater penetration and dispersion, and subsequently the desired grouting material may be forced into the soil or subsoil and cavities, the material initially used to increase penetration and dispersion acting upon the subsequent material in such a manner to effectively seal up the cavities, pores, interstices, or the like and also to bind together the loose soil or subsoil particles by causing such material to swell.

Bentonite is known as being either of a swelling type or a nonswelling type. The swelling type of bentonite is distinguished by its capability of swelling through the absorption of water, the quantity of water absorbed varying up to as high as twenty times the weight of the clay itself. The non-swelling type of bentonite is characterized by the fact that while it contains substantially all of the chemical or physical elements of the swelling type, it is either not capable of swelling to the capacity of the swelling type of bentonite, or is entirely non-swelling. Bentonite is found in various parts of the United States and is found in varying degrees of purity in different localities. The bentonite which, for example, is found commercially in Wyoming is known as the swelling montmorillonite type.

I have found that where a chemical is added to the non-swelling type of bentonite or to the poorer grades of bentonite as well as to certain other types of clays, this non-swelling bentonite, these poorer grades of bentonite and these certain other types of clays, are transformed into a composition having all the desirable physical and swelling characteristics of the swelling type of bentonite.

The following is an analysis of typical swelling montmorillonite bentonite:

| | |
|---|---|
| Moisture at 105° C | 7.38 |
| Silica ($SiO_2$) | 59.18 |
| Alumina ($Al_2O_3$) | 18.43 |
| Ferric oxide ($Fe_2O_3$) | 3.47 |
| Ferrous oxide (FeO) | 0.19 |
| Titanium oxide ($TiO_2$) | 0.24 |
| Phosphoric acid ($P_2O_5$) | 0.027 |
| Lime (CaO) | 1.12 |
| Magnesia (MgO) | 2.34 |
| Soda ($Na_2O$) | 1.29 |
| Potash ($K_2O$) | Trace |
| Sulphur ($SO_2$) | 0.42 |
| Loss on ignition ($H_2O$ at 105° C.) | 5.68 |

An analysis of bentonite of the non-swelling type will be substantially the same as that given above, but for some unknown reasons the reactions of the non-swelling bentonite are not the same and it is not capable of swelling to the extent or to the degree of the swelling type of bentonite. The present invention provides a method and means of transforming the non-swelling bentonite into and obtaining the properties of a swelling bentonite. In the practice thereof the clay comprising the non-swelling bentonite is treated with small amounts of tetra sodium pyrophosphate ($Na_4P_2O_7$) or ($Na_4H_2P_2O_7$). The amount of tetra sodium pyrophosphate used to create a swelling type of bentonite will vary with different types of clay, the proportions being from .25% to 10% as determined by test. The tetra sodium pyrophosphate may be mixed with the clay in the condition in which the clay is mined, wherein the clay is damp, the mixture being afterwards dried and then ground. The tetra sodium pyrophosphate may optionally be mixed with the clay after the clay has first been dried, in which event the mixture is subsequently ground or pulverized in a suitable mill. The mixture may also be made after the clay has just been dried and ground. The combination may also be made by mixing the tetra sodium pyrophosphate in a predetermined quantity of water and spraying the mixture of tetra sodium pyrophosphate and water on the clay, the resulting clay product then being dried and ground. The mixture may also be made after the clay and water have been mixed together to the desired consistency. The mixture may also be made in dry form by dusting into the clay while the grinding or pulverizing process is going on or the mixture can be made by dusting on or otherwise mixing in the tetra sodium pyrophosphate in the desired quantities where the material is used or positioned.

In the grouting of certain porous subsoils, the clay can first be grouted under pressure and subsequently a solution of tetra sodium pyrophosphate may be forced into the grouting so that the clay which is of a non-swelling bentonite character will be made to swell after the penetration of the grouting so as to thereby fill up the pores, shut out water, and bind or solidify sand or other loose soil or the process can be reversed. This grouting operation may be made in wells, blocking or filling earth fissures, dykes, levees or other construction work, or for drilling heaving or caving formations and regaining lost circulation.

Where a grouting liquid is being used such as asphalt emulsions known as bituminous dispersions, cements, fibrous material, liquid rubber, rubber latex, or other grouting liquids, the soil in which the dispersion is being applied may be opened up or loosened so as to permit greater penetration by first forcing the tetra sodium pyrophosphate, under pressure and preferably mixed with a liquid such as water into soil. This will have the effect of permitting a greater penetration of the dispersion material and if desired the tetra sodium pyrophosphate may be mixed directly with the grouting liquid. This will have the effect of dispersing the material in such a manner as to effect a greater penetration. This would apply to Portland cement, liquid rubber, and the present types of manufactured bituminous dispersions, but if this bituminous dispersion is emulsified with the type of clay that I claim as a new process, the bituminous dispersion, when grouted into the soil will swell on contact with the tetra sodium pyrophosphate solution, causing a more compact waterproof mass for drilling or grouting earth subsoils. This would also apply to liquid rubber latex, by mixing the clay with the rubber in a grouting solution, and putting it into the soil under pressure after the tetra sodium pyrophosphate solution had been grouted in, or the process can be reversed.

Where it is desired to increase the swelling capacity of a swell-bentonite, a small proportion or amount of tetra sodium pyrophosphate may be added to or mixed with the bentonite. The amount of tetra sodium pyrophosphate to be added to the bentonite can be determined by a prior test of the bentonite as to its absorbing capacity and its ability to swell to a predetermined degree by the addition of a predetermined amount of tetra sodium pyrophosphate.

What I claim is:

1. The method of grouting soil or strata which includes dispersing the soil or strata by forcing into the soil or strata a liquid formed of tetra sodium pyrophosphate and water, and finally forcing into the dispersed soil or strata a clay having a chemical composition capable of reaction with the tetra sodium pyrophosphate to thereby effect a swelling of the clay.

2. The method of grouting a cavity in the soil which includes initially forcing into the soil a liquid solution of tetra sodium pyrophosphate, and forcing into the cavity a clay which has a normal non-swelling characteristic when brought into contact with water or other liquids initially disposed in the cavity, said clay having a chemical composition such as to react upon contact of the clay with the liquid solution to thereby effect a swelling of the clay.

FRANCIS DALY SULLIVAN.